United States Patent
De Keyzer et al.

(10) Patent No.: US 10,160,311 B2
(45) Date of Patent: Dec. 25, 2018

(54) METHOD FOR MANUFACTURING A FUEL TANK OR FILLING PIPE AND USE THEREOF IN A HYBRID VEHICLE

(71) Applicant: Plastic Omnium Advanced Innovation and Research, Brussels (BE)

(72) Inventors: Pierre De Keyzer, Brussels (BE); Bjorn Criel, Sint-Martens-Lennik (BE); Eric Boucaux, Elincourt Sainte Marguerite (FR)

(73) Assignee: Plastic Omnium Advanced Innovation and Research, Brussels (BE)

( * ) Notice: Subject to any disclaimer, the term of this patent is extended or adjusted under 35 U.S.C. 154(b) by 74 days.

(21) Appl. No.: 14/781,143

(22) PCT Filed: Mar. 28, 2014

(86) PCT No.: PCT/EP2014/056375
§ 371 (c)(1),
(2) Date: Sep. 29, 2015

(87) PCT Pub. No.: WO2014/154900
PCT Pub. Date: Oct. 2, 2014

(65) Prior Publication Data
US 2016/0052386 A1   Feb. 25, 2016

(30) Foreign Application Priority Data
Mar. 29, 2013  (FR) ..................... 13 52941

(51) Int. Cl.
*B60K 15/00*   (2006.01)
*B25J 15/00*   (2006.01)
(Continued)

(52) U.S. Cl.
CPC ..... *B60K 15/03177* (2013.01); *B25J 15/0616* (2013.01); *B25J 19/00* (2013.01);
(Continued)

(58) Field of Classification Search
CPC ........ B60K 15/00; B60K 15/03; B60K 15/03; B60K 15/031; B60K 15/031;
(Continued)

(56) References Cited

U.S. PATENT DOCUMENTS 5,020,687 A  6/1991 Seizert
5,188,981 A  2/1993 Stiles et al.
(Continued)

FOREIGN PATENT DOCUMENTS

CN  104066610 A   9/2014
DE  100 10 900     9/2001
(Continued)

OTHER PUBLICATIONS

International Search Report dated May 8, 201 4 in PCT/EP2014/056375 Filed Mar. 28, 2014.
(Continued)

*Primary Examiner* — Jacob T Minskey
(74) *Attorney, Agent, or Firm* — Oblon, McClelland, Maier & Neustadt, L.L.P.

(57) ABSTRACT

A method for manufacturing a fuel tank or filling pipe including a wall made of thermoplastics material and a fibrous reinforcement over at least part of the surface thereof, the method including: heating the fibrous reinforcement to bring the fibrous reinforcement into an at least partially molten state; introducing the heated fibrous reinforcement, and the wall in at least partially molten state, into a mold; and welding the fibrous reinforcement to the wall using pressure of a gas which inflates the wall and presses the heated fibrous reinforcement firmly against the wall in the molten state.

18 Claims, 5 Drawing Sheets

(51) Int. Cl.
- *B29C 49/00* (2006.01)
- *F16L 19/00* (2006.01)
- *B60K 15/03* (2006.01)
- *B29C 49/04* (2006.01)
- *B29C 49/20* (2006.01)
- *B25J 15/06* (2006.01)
- *B25J 19/00* (2006.01)
- *F16L 9/133* (2006.01)
- *B29K 23/00* (2006.01)
- *B29K 105/08* (2006.01)
- *B29K 105/00* (2006.01)
- *B29L 31/00* (2006.01)

(52) U.S. Cl.
CPC .......... *B29C 49/0047* (2013.01); *B29C 49/04* (2013.01); *B29C 49/20* (2013.01); *F16L 9/133* (2013.01); *B29C 2049/0057* (2013.01); *B29C 2049/2017* (2013.01); *B29C 2049/2065* (2013.01); *B29C 2049/2073* (2013.01); *B29C 2049/2095* (2013.01); *B29K 2023/065* (2013.01); *B29K 2105/089* (2013.01); *B29K 2105/256* (2013.01); *B29L 2031/7172* (2013.01); *B60K 2015/03032* (2013.01); *B60K 2015/03493* (2013.01)

(58) Field of Classification Search
CPC ............ B60K 15/0317; B60K 15/0317; B60K 15/03177; B25J 15/00; B25J 15/06; B25J 15/06; B25J 15/061; B25J 15/061; B25J 15/0616; B25J 19/00; B29C 49/00; B29C 49/004; B29C 49/004; B29C 49/0047; B29C 49/04; B29C 49/20; F16L 9/00; F16L 9/10; F16L 9/13; F16L 9/13; F16L 9/133

See application file for complete search history.

(56) References Cited

U.S. PATENT DOCUMENTS

| | | | |
|---|---|---|---|
| 5,308,571 A | 5/1994 | Stiles et al. | |
| 6,071,370 A * | 6/2000 | Stiles | B29C 49/20 156/244.13 |
| 8,967,418 B2 * | 3/2015 | Martin | B29C 65/02 156/245 |
| 2001/0015513 A1 * | 8/2001 | Schaftingen | B29C 49/0047 264/515 |
| 2005/0104260 A1 | 5/2005 | Van Schaftingen et al. | |
| 2013/0037549 A1 | 2/2013 | Martin et al. | |
| 2015/0027633 A1 | 1/2015 | Criel et al. | |

FOREIGN PATENT DOCUMENTS

| | | | |
|---|---|---|---|
| EP | 0 516 290 | 12/1992 | |
| EP | 1 110 697 | 6/2001 | |
| EP | 2 544 881 | 1/2013 | |
| EP | 2 607 134 A1 | 6/2013 | |
| FR | 2 957 296 | 9/2011 | |
| JP | 2002-103427 | 4/2002 | |
| WO | WO 2010/122065 A1 | 10/2010 | |
| WO | WO 2011/054709 A1 | 5/2011 | |
| WO | WO 2011/110519 A1 | 9/2011 | |
| WO | WO 2011110519 A1 * | 9/2011 | ............ B29C 65/02 |
| WO | WO 2012/031705 A2 | 3/2012 | |

OTHER PUBLICATIONS

Combined Chinese Office Action and Search Report dated Nov. 1, 2016 in Patent Application No. 201480019386.9 (with English translation and English translation of categories of cited documents).

Office Action dated May 7, 2018, in Japanese Application No. 2016-504708 (with English-language translation).

* cited by examiner

METHOD FOR MANUFACTURING A FUEL TANK OR FILLING PIPE AND USE THEREOF IN A HYBRID VEHICLE

The present invention relates first of all to a method for manufacturing a fuel tank and to the use of a tank thus obtained in a hybrid motor vehicle.

A hybrid engine is generally the term used for a combination of a combustion engine and of an electric motor.

There is a general principle of operation for hybrid engines which involves operating either the electric motor or the combustion engine or both at the same time depending on the model.

One of the specific principles is as follows:
during stationary phases (where the vehicle is not moving), both the engine and the motor are switched off;
on start-up, it is the electric motor that sets the vehicle in motion, up to higher speeds (25 or 30 km/h);
when higher speeds are reached, the combustion engine takes over;
in the event of strong acceleration, both the engine and the motor are seen to operate at the same time, making it possible to achieve accelerations equivalent to an engine of the same power, or even higher;
during deceleration and braking phases, the kinetic energy is used to recharge the batteries (note that this functionality is not available on all hybrid engines currently available on the market).

The result of this principle is that the combustion engine does not operate continuously and that, as a result, the phases for purging the canister (active-charcoal filter that avoids fuel vapors being released into the atmosphere) cannot be carried out in the normal way because during these purge phases air, potentially preheated, is circulated through the canister to regenerate it (i.e. to desorb the fuel vapors adsorbed therein), this air then being admitted to the engine where it is burned. Furthermore, hybrid vehicles have been developed in order to reduce fuel consumption and exhaust gas emissions, making engine management for the burning of fuel vapors from the canister even more complex, if not to say impossible, without impairing engine performance.

As a result, the fuel tanks of these engines are generally pressurized (typically to a pressure of the order of 300-400 mbar) in order to limit the charge of the canister, this generally being achieved by a functional element situated after the ventilation valves, referred to as FTIVs (fuel tank isolation valves). This element comprises a safety valve (calibrated for the maximum service pressure of the tank) and an electrical control system so that the tank can be placed at atmospheric pressure prior to filling. The result of this is that these tanks, in comparison with the fuel tanks of conventional combustion engines, need to have enhanced mechanical strength, particularly in the case of tanks made of plastics material.

The solution currently on the market consists of a metal tank of significant thickness, which considerably increases the weight of the tank and thus increases the fuel consumption and exhaust gas emissions.

Other known solutions to the aforementioned pressure problem may consist in increasing the wall thickness of the plastics tanks and/or in the use of internal reinforcements (rods, partitions, etc.) connecting the two walls together, but these solutions generally impinge on the weight, reduce the useful volume of the tank and increase the cost of the tank. Another solution may be to provide the tank with kiss points (i.e. local weldings of the bottom wall and of the top wall), but this solution results in a reduction in the useful volume of the tank.

Another solution is that described in U.S. Pat. No. 5,020,687 and which consists in fixing a woven fabric of reinforcing fibers (without thermoplastic matrix) to the external wall of the tank, this fixing taking place by overmolding of said fabric during the manufacture of the tank by extrusion-blow-molding, the fabric being introduced into the mold prior to the introduction of the parison which, after blow-molding, will yield the tank.

The major disadvantage of this solution however is that it is difficult to achieve impregnation of the reinforcing fibers of the fabric with the molten material from the parison alone. This may result in defective fixing of the reinforcement to the external wall of the tank.

Publication WO 2012/031705A2 envisions an alternative consisting in replacing the woven fabric of reinforcing fibers with a semi-finished composite product containing reinforcing fibers. This finished product has holes through which the molten material from the parison passes in order to achieve mechanical fixing. In order to obtain effective mechanical anchorage, it is necessary for the material of the parison to flow through the holes in sufficient quantities to form something resembling rivets on the other side of the reinforcement. This technique of the prior art may be difficult to achieve because of the viscosity of the parison. Finally, another disadvantage of this known technique lies in the fact that it is necessary to increase the thickness of the tank, and therefore the weight and cost thereof.

It is consequently an objective of the present invention to provide a novel solution for the fixing of a fibrous reinforcement to the wall of a tank, which does not have the disadvantages of the known solutions.

The invention also relates to the manufacture of filling pipes.

A filling pipe is a duct that allows a liquid or a gas to be conveyed into a tank.

In some cases, a filling pipe may be exposed to loose chipping thrown up by the wheels, requiring an additional protective screen. This protective screen can be omitted if a local reinforcement is added to the pipe.

The fixing solution proposed by the invention can be used for a filling pipe.

Furthermore, the invention offers the additional advantage that it allows any finishing operation to be omitted.

In addition, the invention makes it possible to reduce production costs by reducing the amount of labor and shortening the cycle time on the production line.

One subject of the invention is a method for welding a fibrous reinforcement when manufacturing an object chosen from the assembly consisting of a tank and a filling pipe, said object comprising a wall of thermoplastics material, the fibrous reinforcement comprising both a thermoplastics material compatible with that of the object and chopped fibers or long fibers or continuous fibers which may or may not be woven, the welding method comprising the steps consisting in:
heating the fibrous reinforcement to bring it into a molten state,
welding, in a mold, the heated fibers reinforcement to the wall in an at least partially molten state, using the pressure of a gas that inflates the wall against the mold.

The invention thus affords a novel fixing solution that does not have the disadvantages of the known solutions.

Furthermore, the connection between the fibrous reinforcement and the wall, namely the weld, is a securing means that calls upon no mechanical retention (namely no three-dimensional shape that has to engage with another, complementing, three-dimensional shape) but affords continuity of material between the wall and the reinforcement, thereby making the connection more reliable than the known solutions, while at the same time being less bulky.

In the present invention, the wall is considered to be in a molten state if at least that part thereof that is intended to be welded to the fibrous reinforcement is in a molten state. The rest of the wall may therefore be in any state, and notably a non-molten state.

In one preferred embodiment, the fibrous reinforcement is heated using a heating element that is placed in front of the reinforcement in order to heat it by radiation or by contact.

This heating may take place in the mold, in which case the heating element needs to be placed near the reinforcement in the mold, or outside of the mold.

In one preferred embodiment, the fibrous reinforcement is heated outside of the mold to bring it into a molten state and then introduced heated into the mold.

In one preferred embodiment, the method comprises a step consisting in preforming the fibrous reinforcement, this preforming being performed at least partially outside of the mold and/or in the mold.

This prior forming of the reinforcement, or preforming of the reinforcement, may be performed on a preforming support, after the reinforcement has been heated and before it is transferred into the mold. The forming may also be performed in the mold, after the reinforcement has been heated.

The forming may also be performed while the reinforcement is being transferred toward the mold.

In an alternative, the step of preforming the fibrous reinforcement on a preforming support is performed outside of the mold after the reinforcement has been heated and before it is transferred into the mold.

The fuel for which the tank according to the invention is intended may be gasoline, diesel fuel, a bio fuel, etc. and may have an alcohol content of from 0 to 100%.

According to the invention, the tank or the pipe is made of thermoplastics material. Thermoplastics material means any thermoplastic polymer, including thermoplastic elastomers, and mixtures thereof. The term "polymer" covers both homopolymers and copolymers (notably binary or ternary polymers). Examples of such copolymers are, non-limitingly: random copolymers, sequential or block copolymers, and graft copolymers.

Any type of polymer or of thermoplastic copolymer the melting point of which is below the decomposition temperature is suitable. Synthetic thermoplastics materials that have a melting range spread over at least 10° C. are particularly suitable. Examples of such materials include those that have polydispersion of their molecular mass.

In particular, use may be made of polyolefins, thermoplastic polyesters, polyketones, polyamides and copolymers thereof. A mixture of polymers or of copolymers may also be used, as may a mixture of polymeric materials with inorganic, organic and/or natural fillers such as, for example but non-limitingly: carbon, clays, salts and other inorganic derivatives, natural or polymer fibers. It is also possible to use multi-layered structures made up of layers which are stacked and joined together comprising at least one of the polymers or copolymers described hereinabove.

One polymer that is often used is polyethylene. Excellent results have been obtained with high density polyethylene (HDPE).

The wall of the tank or of the pipe may consist of a single layer of thermoplastics material or of two layers. One or more possible other additional layers may advantageously consist of layers made of a material that acts as a barrier to liquids and/or gases. For preference, the nature and thickness of the barrier layer are chosen so as to minimize permeability to the liquids and gases in contact with the interior surface of the tank or of the pipe. For preference, this layer is based on a barrier resin, namely a resin impermeable to fuel such as EVOH for example (partially hydrolyzed ethylene-vinyl acetate copolymer). Alternatively, the tank or the pipe may be subjected to a surface treatment (fluorination or sulfonation) the objective of which is to render it impermeable to the fuel.

The tank or the pipe according to the invention preferably comprises an EVOH-based barrier layer situated between HDPE-based external layers.

The fibrous reinforcement mentioned in the present invention may take numerous forms; it is generally a sheet comprising both a thermoplastics material and chopped fibers or long fibers or continuous fibers which may or may not be woven. In general, the chopped fibers have final lengths of a few tens/hundreds of microns. In the case of the long fibers, the residual lengths are a few millimeters. If the length of the fibers used is several tens of centimeters then these are referred to as continuous fibers or continuous filaments. Woven fibers are preferred. These fibers may be based on glass, on carbon, on a polymer (such as a polyamide, for example an aromatic polyamide such as aramid) or may even be natural fibers such as hemp or sisal. They are preferably glass fibers (type E, S or other). The fibers of the fibrous reinforcement according to the invention are preferably compatible with the thermoplastics material and, therefore, in general, compatible with polyolefins and, in particular, with HDPE. In order to obtain this compatibility, the fibers may be sized (surface treated) with a compatibility substance such as a silane. A binder of reactive HDPE type may also be used. In this context, reactive functions of maleic anhydride type may advantageously be used.

According to the invention, the fibrous reinforcement comprises a thermoplastics material compatible with that of the tank or of the pipe, or even identical therewith. Compatibility means that the thermoplastics material of the fibrous reinforcement and the thermoplastics material of the tank or of the pipe can be welded together when brought into contact with one another while they are in a molten state. In the case of fuel tanks, it is generally polyethylene and particularly HDPE. The fiber content in the reinforcement is preferably at most 70%, preferably at most 50%, or even at most 30%, the rest of the reinforcement essentially consisting of thermoplastics material. In other words, the thermoplastics-material content of the reinforcement is at least 30%, preferably 50%, or even at least 70%. The thermoplastics material is preferably melted around/into the mass of fibers so as to constitute a homogeneous sheet or plaque having thermoplastics material over at least part of its surface to make the welding easier. In practice, the reinforcement may be produced by calendering, compression molding, injection molding, spray molding or even molding under. According to one particularly preferred alternative form, the reinforcement covers at least part of a zone in which a component is attached (for example: the filling neck to which the filling pipe will be attached) and includes a barrier layer so that it performs both a reinforcing function (in this often fragile zone) and an impermeability function. In this alternative form, the reinforcement is advantageously obtained by the compression molding of a multilayer sheet including a barrier layer (and, for preference, a sheet comprising a layer of EVOH between two sheets of HDPE), a mat of fibers (preferably randomly distributed non woven continuous glass fibers) and a sheet of HDPE.

The thickness of the reinforcement is preferably comprised between 0.1 and 2 mm. In order for the reinforcement to be mechanically effective, its module is preferably at least 5000 MPa, or even at least 10 000 MPa.

This reinforcement may be combined with other reinforcing techniques or elements, for example a portion of wall of greater thickness and/or comprised between at least two elements (accessories) connecting the bottom and top wall parts of the tank (which means to say respectively the wall parts constituting the bottom and the roof of the tank when the tank is mounted on the vehicle). These elements may for example comprise the part of the interior face of the tank that is substantially vertical when the tank is mounted on the vehicle; a pump/gage module; a kiss point (or local welding-together of the bottom and top walls of the tank) and, in particular, one of the pads described in application WO2011054709 in the name of the applicant company incorporated by reference into the present application; and/or a hollow reinforcing post, possibly incorporating an active function as described in application WO2010122065 in the name of the applicant company and incorporated by reference into the present application likewise.

The mold that can be used for manufacturing the tank or the pipe according to the invention may be of any kind, provided that it contributes to giving the tank or the pipe its shape.

This mold advantageously comprises, at the site intended for the preheated reinforcement, means for keeping the mold at a temperature high enough to prevent the reinforcement from cooling before it has become welded to the sheet.

The method according to the invention may then include a step of heating the reinforcement, which step is executed between the moment at which the reinforcement is introduced into the mold and the moment at which it is welded to the wall.

This may be a blow-molding mold that gives a sheet the shape of at least part of the tank or of the pipe, or a post-blowing mold that enables a sheet already formed in a blow-molding mold to retain its shape as it cools under the pressure of a gas. A sheet here means a preform of molten thermoplastics material, generally extruded, and having a cylindrical shape and/or the form of flat panels and/or cylinder halves for example.

For preference, the tank or the pipe is produced by co-extrusion-blow-molding. In that case, the use of a continuous extrusion technique or the use of an accumulation extrusion technique or the use of a sequential extrusion technique are all equally possible, all these techniques being well known to those skilled in the art.

According to the invention, once the reinforcement has been welded to the wall of the tank or of the pipe, the tank or the pipe is left to cool, preferably down to a temperature such that the dimensional stability of its wall is reached. In general, this will substantially be ambient temperature, special conditioning not being required (except perhaps in order to accelerate cooling). One notable advantage of the invention is that the welding of the reinforcement to the wall of the tank or of the pipe takes place in line with the molding of the tank or of the pipe, whether this be during the shaping of the sheet by blow-molding or during the post-blowing of the tank or of the pipe, thereby affording a reduction in production cycle time.

According to the invention, the reinforcement (and, where applicable, the surface of the zone thereof that welds to the tank or to the pipe) is heated before welding is effected. To this end, infrared or laser radiation or a stream of hot air, or even mirror heating, may be applied thereto.

The temperature of heating will depend on the technique used. It is preferable for the temperature to be high enough to guarantee that the thermoplastics material (for example the HDPE) melts. The thermoplastics material therefore needs to be raised to a suitable temperature (in the case of HDPE, in excess of 135° C. and preferably in excess of 150° C. or even of 180° C.)

One advantage of the invention is that the reinforcement welds itself to the wall of the tank or of the pipe while said wall is still hot, as a result of the method of manufacture of the tank or of the pipe, namely of the blow-molding of a sheet or the post-blowing of the tank or of the pipe in order to cool it, without the need for an additional operation subsequent to these steps.

Another subject of the invention is a method of manufacturing an object chosen from the assembly consisting of a fuel tank and of a filling pipe, by executing a step of introducing a sheet of thermoplastics material in an at least partially molten state into a blow-molding mold, a step of shaping the sheet to the cavity of the mold by blow-molding using a blow-molding gas, and a step of demolding the sheet, the object comprising a wall of thermoplastics material which is formed by said sheet and locally reinforced by a fibers reinforcement comprising both a thermoplastics material compatible with that of the sheet and chopped fibers or long fibers or continuous fibers which may or may not be woven, the method being characterized in that it comprises the steps of the method described hereinabove for welding the fibrous reinforcement to the sheet, the mold of the welding method being the blow-molding mold and the pressure of the gas which inflates the wall against the mold during welding being the pressure of the blow-molding gas.

By virtue of the invention, the method of manufacturing a tank or a pipe incorporates the step of welding the fibrous reinforcement to the wall of the tank or of the pipe without there being any need to provide a separate welding operation. The blow-molding operation is put to use not only for shaping the sheet, as is known, but also for welding the reinforcement to the wall of the tank or of the pipe. The fixing of the reinforcement to the wall of the tank or of the pipe by welding further affords the advantages already mentioned, by comparison with a mechanical means of attachment.

In an advantageous alternative form of this method, the fibrous reinforcement is introduced into the mold to press it against a face of the sheet opposite to the interior face of the mold. In other words, the reinforcement lies on the face of the sheet that faces toward the future inside of the tank or of the pipe.

In another alternative form, the fibrous reinforcement is introduced into the mold to press it against the interior face of the mold. In this case, the reinforcement lies on that face of the sheet that faces toward the future outside of the tank or of the pipe.

In one particular embodiment of the method of manufacturing the tank, two sheets of thermoplastics material in an at least partially molten state are introduced into a blow-molding mold consisting of two half-molds and of a core separating the two half-molds, one sheet being introduced between a first half-mold and the core, the other sheet being introduced between the second half-mold and the core, the method further comprising a step of bonding the two sheets together after they have been shaped, by opening the mold, removing the core from between the two half-molds, and bringing the two half-molds back against one another.

It is common practice for those skilled in the art to refer to each of the two half-molds as a "cavity". The term "shell" is also used.

This method is described in the applicant company's published application EP1110697 and notably affords the advantage of allowing various components to be incorporated into the tank right from the time that the latter is being shaped by blow-molding. By virtue of the invention, this advantage is supplemented by the incorporation of a fibers reinforcement on the wall of the tank by making use of the pressure of the blow-molding gas and without operation away from the tank manufacturing line.

The core therefore comprises mobile means of positioning the reinforcement near the interior wall of the mold, allowing the reinforcement to be pressed against the sheet. The reinforcement is therefore pressed against that face of the sheet that is intended to constitute the interior face of the tank.

In another sub-alternative form, rather than pressing the reinforcement against the sheet, it is pressed, still using the core, against the internal surface of one of the half-molds. The weld between the preheated reinforcement and the sheet therefore occurs as a result of the compression of the reinforcement between the internal surface of the half-mold and the sheet, under the effect of the pressure of the blow-molding gas.

The invention also relates to a method of manufacturing an object chosen from the assembly consisting of a fuel tank and of a filling pipe, by executing a step of demolding a sheet in an at least partially molten state from a blow-molding mold in which it has been shaped, a step of introducing the sheet into a post-blowing mold, and a step of inflating the sheet against the wall of the post-blowing mold using a post-blowing gas, the object comprising a wall made of thermoplastics material formed by said sheet and locally reinforced with a fibers reinforcement comprising both a thermoplastics material compatible with that of the sheet and chopped fibers or long fibers or continuous fibers which may or may not be woven, the method being characterized in that it comprises the steps of the method for welding the fibrous reinforcement to the sheet, which method is described hereinabove, the welding mold being the post-blowing mold and the pressure of the gas which inflates the wall against the mold being the pressure of the post-blowing gas.

In this embodiment of the invention, use is made of the pressure of the post-blowing gas to weld the fibrous reinforcement to the tank wall or pipe wall still in the molten state. The operation is still performed on line, with no additional operation on the tank or the pipe, away from its production line.

According to these embodiments of the invention, the pressure applying the reinforcement against the welding zone is therefore applied by direct mechanical contact (contact pressure) using the blow-molding gas or the post-blowing gas, which in general is compressed air.

The reinforcement may be positioned in the mold using a gripper of a fibers reinforcement comprising both a thermoplastics material and chopped fibers or long fibers or continuous fibers which may or may not be woven, for the manufacture of fuel tanks or filling pipes, comprising a wall of thermoplastics material which is formed by said sheet and locally reinforced with such a fibers reinforcement the thermoplastics material of which is compatible with that of the sheet, the gripper being intended to be moved by a robot or by an actuator fixed to a core of the mold, where appropriate, for positioning the fibrous reinforcement in the mold and being equipped with retaining means such as, for example, suction cups, preferably metal ones, and with means of heating the reinforcement.

The reinforcement positioned in the mold can be kept in position there by retaining means, for example suction means sucking through the wall of the mold.

In one particular embodiment of the invention, the sheet is provided with at least one compression-resistant zone comprised at least in part in the welding zone of the reinforcement, the purpose of this being to withstand the force connected with the pressure applied at the time of welding.

The welding of the reinforcement to the tank or the pipe does not necessarily need to be performed over the entire surface thereof. For example, it is possible to weld only the edges and a few central zones. However, advantageously, welding takes place over substantially the entire surface, namely at least 90% thereof, or even ideally 100%.

Another subject of the present invention is a tool for shaping a fibers reinforcement, comprising an oven for heating said reinforcement to a temperature sufficient to bring it into a molten state, and a cavity for shaping the reinforcement in the molten state to a predetermined three-dimensional shape.

In one particular embodiment, the cavity of the shaping tool comprises two jaws which can separate for inserting the reinforcement and close together to shape the reinforcement, one of these two jaws being able to move in a given direction (not necessarily a straight line, for example a circular path) and equipped with means of gripping the shaped reinforcement.

For preference, the gripping means are equipped with an air suction system.

In one alternative form, the two jaws of the shaping tool are able to move, although just one is equipped with gripping means.

In another embodiment, the cavity for shaping the reinforcement in the molten state is a support, for example a mesh, of predetermined three-dimensional shape over which the reinforcement rests under its self weight.

In one particular embodiment, one of the two jaws of the cavity of the shaping tool consists of a collection of parallel plates arranged perpendicular to the direction in which the two jaws close together and having, facing the other jaw of the cavity, edges forming a layer for shaping the reinforcement. The layer is similar to the final shape that the reinforcement will have after molding.

Such a cavity offers the advantage that the oven and the shaping tool may be separate and that the reinforcement may be transferred from one to the other supported by a mesh, the rungs of which fit in between the parallel plates to deposit said reinforcement on the layer formed by the edges of said parallel plates.

In one particular embodiment, the oven comprises means that allow the reinforcement to be heated on both faces thereof.

Another subject of the present invention is a mold as described hereinabove, in all alternative forms thereof, and notably a blow-molding mold consisting of two half-molds and of a core separating the two half-molds.

Another subject of the invention is a core of such a mold, comprising mobile means of positioning the reinforcement near the interior face of the mold.

The present invention also relates to a tank or pipe that can be obtained by a method as described hereinabove, comprising a wall of thermoplastics material and a fibers reinforcement welded over at least part of its external surface, this fibers reinforcement comprising a plastics material of the same kind as or compatible with that of the external surface of the tank or of the pipe and woven continuous fibers. These are preferably glass fibers as described hereinabove. The preferred alternative forms described hereinabove in the context of the method according to the invention apply to the tank or to the pipe according to the invention.

The present invention also relates to the use of a tank (obtained by a method) as described hereinabove as a fuel tank for a hybrid vehicle. This tank may also be used on a conventional vehicle, where the reinforcing effect obtained may be put to good use to avoid the need to resort to the metal straps generally employed to prevent the lower wall of the tank from sagging when the tank is fixed to the bottom of the vehicle body. The presence of the reinforcement can also make it possible to reduce the thicknesses of the tank, leading to a reduction in weight and an increase in useful volume. In the case of the pipe, the presence of the reinforcement makes it possible to avoid the addition of a screen to protect against loose chippings.

It should also be noted that the reinforcing effect obtained by the subject matter of the invention can be combined with the use of other known reinforcements such as the straps, the kiss points, the internal reinforcements (rods, partitions), overmolded fabrics, etc. mentioned hereinabove and any other type of reinforcement both internal and external (especially since the first type makes it possible to contribute toward obtaining a compression-resistant zone). The combination of the invention with these known techniques, particularly those known from applications WO2011054709 and WO2010122065 make it possible to reduce the size and/or number of kiss points, internal reinforcements (rods, partitions), overmolded fabrics, etc. Thus the weight of the final solution is minimized and the useful volume of the tank is maximized.

Another subject of the invention is a method of manufacturing an object chosen from the assembly consisting of a fuel tank and of a filling pipe, by executing a step of introducing a sheet of thermoplastics material in an at least partially molten state into a blow-molding mold, a step of shaping the sheet to the cavity of the mold by blow-molding using a blow-molding gas, and a step of demolding the sheet, the object comprising a wall of thermoplastics material which is formed by said sheet and locally reinforced by a fibers reinforcement comprising both a thermoplastics material compatible with that of the sheet and chopped fibers or long fibers or continuous fibers which may or may not be woven, the method being characterized in that it comprises the steps consisting in:

introducing the fibrous reinforcement into the blow-molding mold,     heating the fibrous reinforcement in order to bring it into a molten state, this step being executed before, during or after the introduction step,     applying the heated fibers reinforcement introduced into the mold against a face of the sheet opposite to the mold cavity,     in the blow-molding mold, welding the fibrous reinforcement to the sheet in an at least partially molten state.

In one particular embodiment, the pressing of the fibrous reinforcement against the face of the sheet opposite to the mold cavity is performed using a mobile element borne by a robot external to the mold or by a core of the mold (when the blow-molding mold consists of two shells and of a core separating the two half-molds).

Figure 1:
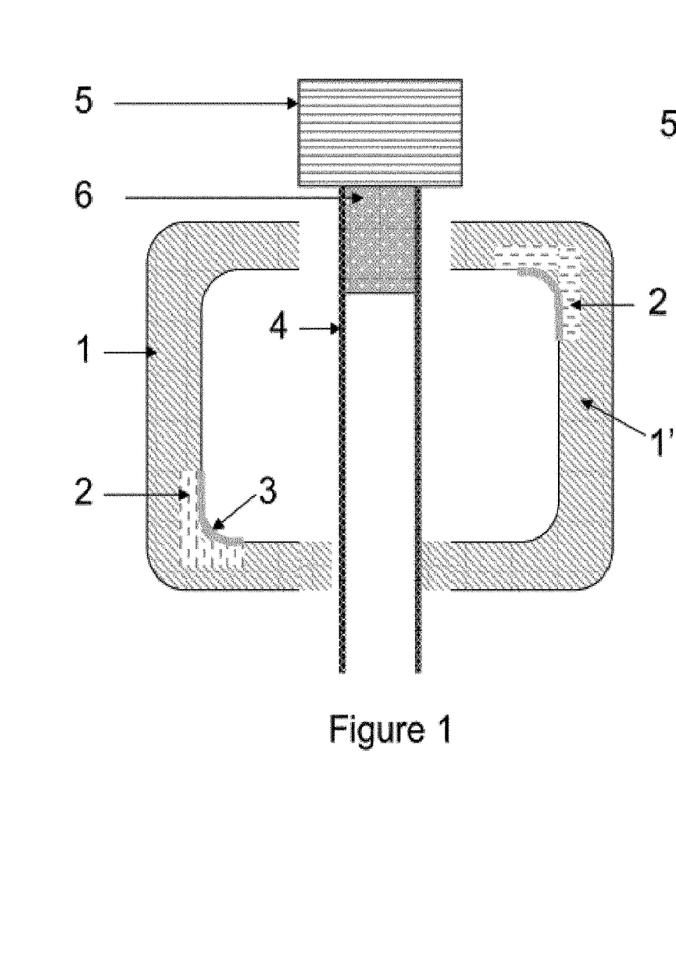
FIG. 1: in cross section, a two-shell mold in the open position.

The present invention is illustrated non limitingly in the attached figures which schematically depict:

FIG. 1 depicts, in vertical section, two opposing shells 1 and 1' of an open mold for the manufacture of a fuel tank.

Each shell 1, 1' here has a simple shape with planar perpendicular walls connected by fillets, but any hollow shape is possible.

As is known, an extrusion die 5 fitted with a forming tool 6 allows a sheet or tubular parison 4 to be produced just above the mold, while the two shells 1, 1' are parted from one another. In place of the tubular parison it would of course be possible to use two planar or sheet-form parisons for example according to the method described in EP1110697.

The terms "planar" and "tubular" here refer to objects the shape of which is respectively planar or tubular approximately overall. The actual conditions of extrusion of the sheet are such that the sheet inevitably has irregularities of shape which prevent it from conforming rigorously to the intended geometric shape.

Two reinforcements 3 and 3' have been preheated and introduced into the mold, placing one of them on a fillet of the internal surface of one of the shells 1', and the other 3' on a planar part of the internal surface of the other shell 1. Placement of the reinforcement 3 on a non-planar zone entails shaping this reinforcement. This shaping may have taken place beforehand in a shaping tool or may be performed in the mold, by pressing the reinforcement precisely against the internal wall of the shell at the appropriate point of this shell.

Whatever the method used for the shaping of the reinforcement 3, a means 2 for maintaining the temperature of the part of the shell surrounding the zone at which each reinforcement is positioned has also been provided so that the reinforcements do not cool excessively quickly upon contact with the mold. This is because it is important, according to the invention, for welding to take place between each reinforcement 3 (respectively 3') in the molten state and the parison 4 which is also in the molten state. Any premature cooling of the reinforcement would detract from this welding. This premature cooling can be avoided in various ways, for example by providing such temperature maintaining means 2 or by increasing the temperature to which the reinforcement is heated so that it is still in the molten state at the time of welding or alternatively by reducing the time the reinforcement spends waiting in the mold before welding takes place. Another solution may consist in bringing a heating element up close to the reinforcement positioned in the mold, in order to heat it by radiation or by contact prior to the welding operation.

A retaining means for keeping each reinforcement in position against the wall of the shell is also provided. This means (not depicted) may be suction of air through a duct provided for this purpose in the shell or even mechanical retention (for example using grips or rods, which may or may not pass through) of the external edge or of the reinforcing medium.

A length of parison 4 equivalent to the height of the mold has also been lowered either during the positioning of the reinforcements or beforehand or afterwards.

Figure 2:
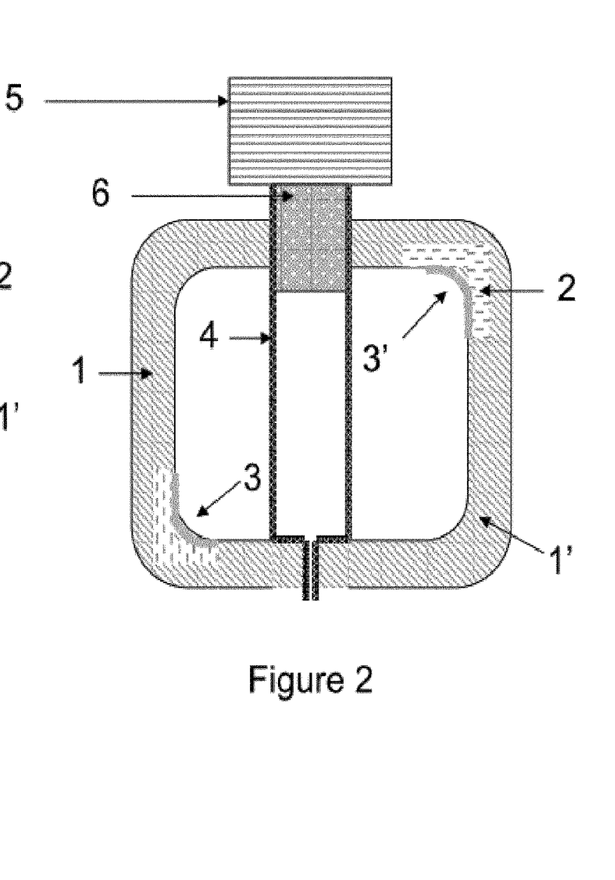
FIG. 2: in cross section, the same mold in the closed position, before the blow-molding of a sheet.

The mold is next closed by bringing the two shells 1, 1' thereof together, as can be seen in FIG. 2. The parison finds itself trapped to its lower end between the two shells and at the exit from the extrusion head 5 between the two shells and the forming tool 6.

The blow-molding of the parison is then commenced, by injecting into it air at a pressure varying from 5 to 10 bar, depending on the dimensions of the mold.

Figure 3:
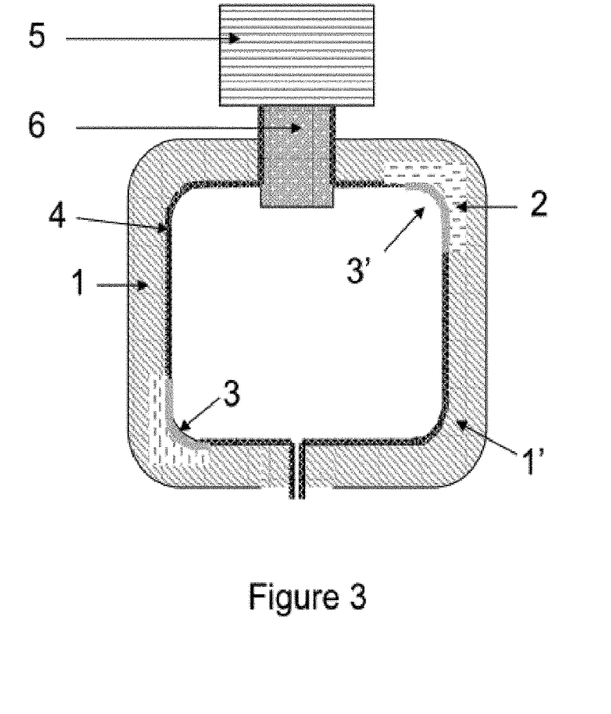
FIG. 3: in cross section, the same mold in the closed position, after the blow-molding of the sheet.

The pressure of the air presses the parison against the walls of the shells 1 and 1' and brings the parison to the geometry of the tank that is in the process of being manufactured.

An additional effect of the air pressure is that of pressing the parison in the molten state against the reinforcements in the molten state held in the mold. This results in the reinforcements becoming welded to the parison.

A heating station that can be used for preforming the reinforcement and a method for handling the reinforcement using a vacuum gripper will now be described with reference to FIGS. 4 to 9.

Figure 4:
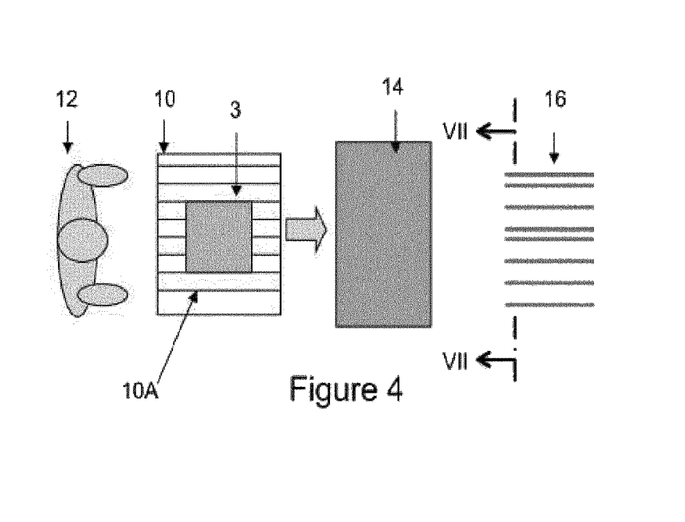
FIG. 4: view from above of a station for shaping a fibers reinforcement.

The steps in the method are as follows:

FIG. 4: The reinforcement 3 is loaded onto a mesh 10 by an operator 12. This mesh comprises a succession of metal rungs 10A which are parallel in just one direction. It is mounted on a rail (not depicted) and progresses automatically toward an oven 14 after it has been loaded.

The rungs of the mesh need to be able to raise the reinforcement 3 from beneath. To do this, the rungs need to have suitable spacing to provide the reinforcement with an appropriate support even when the reinforcement has reached a molten state.

Figure 5:
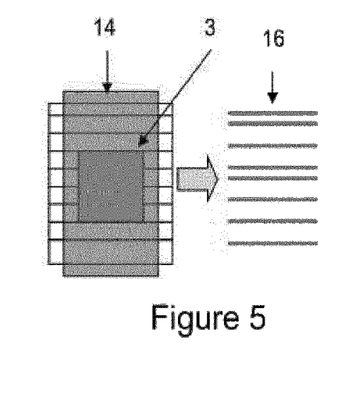
FIGS. 5 and 6: view from above of an oven of the installation of FIG. 4, FIGS. 7 and 8: view in section on VII-VII of a shaping tool of FIG. 4, FIG. 9: part of the shaping tool of FIGS. 7 and 8 during the transfer of the reinforcement and the placement thereof in a mold.

FIG. 5: The reinforcement is heated in the oven 14. For preference, the two faces of the reinforcement are heated simultaneously, so as to reduce the cycle time.

Regarding the oven:

The use of heating metal strips emitting in the infrared as a heating element of the oven yields good results. This use is non limiting. Further, these heating elements are insensitive to vibration and have a life compatible with the envisioned application, namely the manufacture of tanks (estimated at 8000 h at optimal use according to the manufacturer).

If necessary, the heating power may be regulated (pyrometer with control loop) so as to reduce the sensitivity of the heating to variations in workshop temperature (drafts, etc.).

Figure 6:
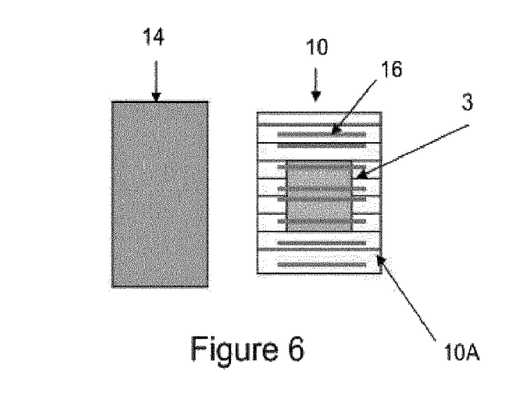

FIG. 6: Once heating is complete, the mesh on which the reinforcement is laying leaves the oven and is positioned in a cavity of a 3D shaping tool 16 to shape the reinforcement in the molten state to a three-dimensional shape. The shell of the forming tool constitutes a preforming support and comprises two jaws, a lower jaw 18A capable of moving vertically, and an upper jaw 18B, as may be seen in FIG. 7.

Figure 7:
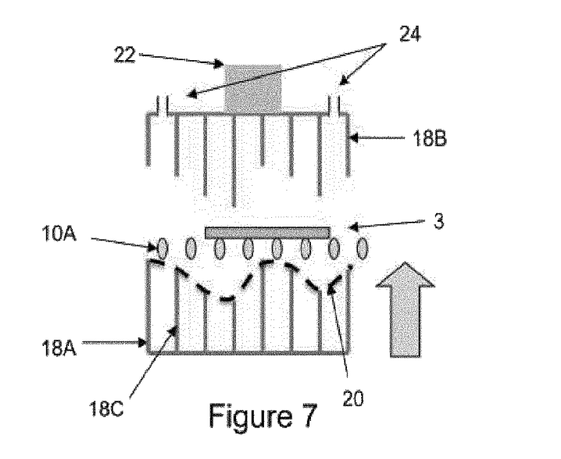

FIG. 7: The upper jaw 18B performs a second function: it is a gripper. This gripper 18B positions itself over the reinforcement.

Figure 8:
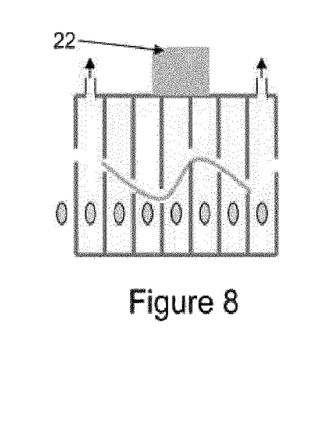

FIG. 8: The lower jaw 18A presses against the lower face of the reinforcement and compresses it against the gripper 18B. This operation shapes the reinforcement to the desired 3-dimensional shape.

The lower jaw 18A is made up of vertical plates 18C which slide between the rungs 10A of the mesh on which the reinforcement 3 rests. The plates have top edges that form a layer (which is imaginary and embodied in FIG. 7 by a discontinuous line 20) that coincides with the three-dimensional shape that it is desired to be imparted to the reinforcement.

For preference, retaining rods (not depicted) are mounted on actuators (not depicted) and prevent the reinforcement from slipping between the jaws as they close, by holding it in place during this closing. In the case of a reinforcement measuring 340 mm×109 mm, two actuators 3 mm in diameter are enough to maintain the positioning. The stroke of the actuators is adjusted so that efficient pressure is applied to the reinforcement without damaging it. This retention is preferably located in the zone of the first contact during closure of the jaws.

Figure 9:
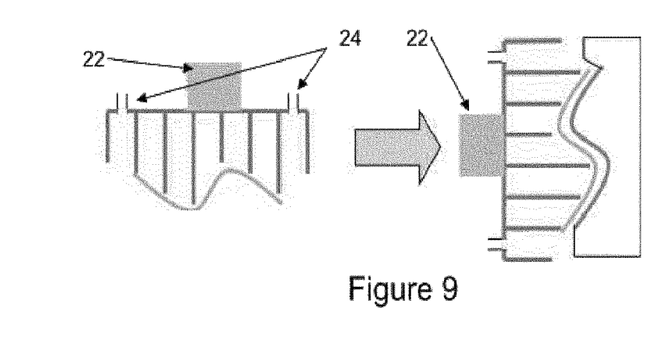

FIG. 9: The three-dimensionally shaped reinforcement is picked up by a robot 22 bearing the gripper 18B under partial vacuum.

The vacuum is preferably obtained using a Venturi-type system. The level of vacuum is adjusted so as not to cause excessive deformation of the reinforcement. The inventors have found that a vacuum of −266 mbar provides effective retention of the reinforcement on the gripper.

Use will preferably be made of a number of orifices 24 to create the vacuum. This is because use of a single orifice causes flows of air that cool the reinforcement in the vicinity of this orifice.

The gripper may have an edge following the final shape of the reinforcement. This edge may be embodied by a flat surface a few millimeters wide.

This edge may be covered with PTFE (or some other non-stick coating) to prevent molten material from being deposited, something which could occur over the long-term.

In addition, regulating the temperature of the gripper makes it possible to avoid excessively rapid cooling of the reinforcement during transfer to the blow-molding mold. In particular, a water-based (or oil-based) control system or a system involving an electric heater installed on a metallic element of the gripper makes it possible to ensure that the temperature of the fibrous reinforcement is effectively maintained.

Conversely, the control system needs to make it possible to avoid the temperature of the gripper increasing as a result of repeated contacts with the reinforcement in the molten state. One alternative is to place the gripper on a heating or cooling station during standby phases. However, temperature regulation is less straightforward in that case.

As already explained with reference to FIGS. 1 to 3, the surface of the mold in contact with the reinforcement may be equipped with suction systems (of the vent type), not depicted.

The size of these vents needs to be sufficiently small to prevent the reinforcement from entering there as a result of the high pressures applied during the blow-molding of the parison against the mold.

For preference, retractable rods are positioned on the surface of the mold in contact with the reinforcement. These rods pass through the reinforcement as it mates with the surface of the mold, thereby assisting with the transfer of the reinforcement between the gripper and the mold.

For preference, regulating to a specific temperature (higher than the average temperature of the mold) makes it possible to avoid excessively rapid cooling of the reinforcement (for example: zone at 60° C. whereas the rest of the mold is at 11° C.)

The robot thus places the reinforcement at the surface of a blow-molding mold.

During a next step (not illustrated), the tank is blow-molded, causing the reinforcement to be overmolded by contact and pressure with the molten parison.

Figure 10:
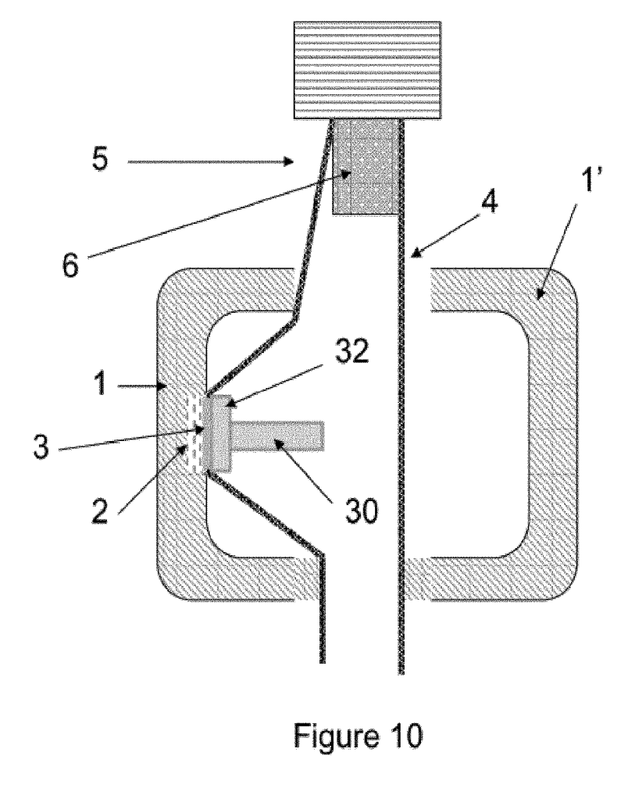
FIG. 10: in cross section, a two-shell mold during a step of positioning and welding a fibers reinforcement using a mobile element.

In the embodiment of FIG. 10, the two same shells 1 and 1' as before are depicted spaced apart, under an extrusion head 5 that produces a sheet or tubular parison 4.

The two shells 1 and 1' are used to carry out a method of manufacturing a fuel tank.

According to this method, the sheet 4 of thermoplastics material leaves the extrusion head 5 in an at least partially molten state. It enters between the two shells 1 and 1', namely enters a blow-molding mold consisting of these two shells and possibly of a core (not depicted).

The sheet 4 is intended to be blow-molded in the blow-molding mold (when the two shells have been brought together) by blow-molding using a blowing gas.

In the step depicted in FIG. 10, this blow-molding has not yet taken place.

A fibers reinforcement 3 comprising both a thermoplastics material compatible with that of the sheet 4 and chopped fibers or long fibers or continuous fibers which may or may not be woven is introduced into the blow-molding mold using a mobile element 30 which may be borne by a robot external to the mold (not depicted) or by a core of the mold (not depicted). The mobile element may for example be an actuator fixed to the core. The mobile element 30 ends in a shape 32 which in this instance is planar but more generally is adapted to suit the part of the interior face of the shell 1 against which the sheet 4 will be pressed under the pressure of said shape 32.

The mobile element comprises means of gripping the fibrous reinforcement, which means are not detailed here.

In this instance, the fibrous reinforcement has been heated beforehand to bring it into the mold in a molten state. However, this heating could take place while the reinforcement 3 is being transported by the mobile element 30 or prior to this transporting. An optional means 2 maintains the temperature of the region of the shell 1 near to the fibrous reinforcement 3.

As can be seen in FIG. 10, the mobile element 30 has the function of pressing the reinforcement 3 against a face of the sheet 4 opposite to the interior face of the shell 1.

During this pressing, the fibrous reinforcement 3 becomes welded to the sheet 4 which is in an at least partially molten state.

Welding may be complete right from this stage of operations. As an alternative, welding is perfected by applying the pressure of the blow-molding gas to the sheet 4 when the latter is being shaped by blow-molding against the two shells.

In another alternative form that is compatible with the preceding one, the fibrous reinforcement 3 is pressed against the sheet 4 after the step of blow-molding the sheet 4.

The invention claimed is:

1. A method for welding a fibrous reinforcement when manufacturing an object chosen from an assembly of a tank and a filling pipe, the object including a wall of thermoplastics material, the welding method comprising:

heating a fibrous reinforcement to bring the fibrous reinforcement into a molten state, the fibrous reinforcement including both a thermoplastics material compatible with that of the object and chopped fibers or long fibers or continuous fibers which may or may not be woven, the fibrous reinforcement being located on an external face of the object without increasing significantly a thickness of the object and decreasing a useful capacity of the object; and welding, in a mold, the heated fibrous reinforcement to the wall in an at least partially molten state, using pressure of a gas that inflates the wall against the mold.

2. The method as claimed in claim 1, wherein the object is a fuel tank.

3. The method as claimed in claim 1, wherein the object is a filling pipe.

4. The method as claimed in claim 1, wherein the fibrous reinforcement is heated using a heating element that is placed in front of the fibrous reinforcement to heat the fibrous reinforcement by radiation, by convection, or by contact.

5. The method as claimed in claim 1, wherein the fibrous reinforcement is heated outside of the mold to bring the fibrous reinforcement into a molten state and then introduced heated into the mold.

6. The method as claimed in claim 1, further comprising preforming the fibrous reinforcement, the preforming being performed at least partially outside of the mold and/or in the mold.

7. The method as claimed in claim 6, wherein the preforming the fibrous reinforcement on a preforming support is performed outside of the mold after the fibrous reinforcement has been heated and before the fibrous reinforcement is transferred into the mold.

8. The method as claimed in any claim 1, wherein the thermoplastics-material content of the fibrous reinforcement is at least 30%, or 50%, or at least 70%.

9. The method as claimed in claim 1, wherein there are provided, in the mold, at a site intended for the preheated reinforcement, means for keeping the mold at a temperature high enough to prevent the fibrous reinforcement from cooling before the fibrous reinforcement has become welded to the sheet.

10. A method of manufacturing an object chosen from an assembly a fuel tank and of a filling pipe, comprising:

introducing a sheet of thermoplastics material in an at least partially molten state into a blow-molding mold;

shaping the sheet to a cavity of the mold by blow-molding using a blow-molding gas; and demolding the sheet;

the object comprising a wall of thermoplastics material which is formed by the sheet and locally reinforced by a fibers reinforcement comprising both a thermoplastics material compatible with that of the sheet and chopped fibers or long fibers or continuous fibers which may or may not be woven;

the method further comprising the method as claimed in claim 1 for welding the fibrous reinforcement to the sheet, the mold of the welding method being the blow-molding mold and the pressure of the gas which inflates the wall against the mold during welding being the pressure of the blow-molding gas.

11. The method as claimed in claim 10, wherein the fibrous reinforcement is introduced into the mold to press the fibrous reinforcement against a face of the sheet opposite to an interior face of the mold.

12. The method as claimed in claim 10, wherein the fibrous reinforcement is introduced into the mold to press the fibrous reinforcement against an interior face of the mold.

13. The method as claimed in claim 10, wherein two sheets of thermoplastics material in an at least partially molten state are introduced into a blow-molding mold of two half-molds and of a core separating the two half-molds, one sheet being introduced between a first half-mold and the core, the other sheet being introduced between the second half-mold and the core, the method further comprising:
bonding the two sheets together after they have been shaped, by opening the mold, removing the core from between the two half-molds, and bringing the two half-molds back against one another.

14. A method of manufacturing an object from an assembly of a fuel tank and of a filling pipe, comprising:
demolding a sheet in an at least partially molten state from a blow-molding mold in which the sheet has been shaped;
introducing the sheet into a post-blowing mold;
inflating the sheet against an interior face of the post-blowing mold using a post-blowing gas;
the object comprising a wall made of thermoplastics material formed by the sheet and locally reinforced with a fibers reinforcement comprising both a thermoplastics material compatible with that of the sheet and chopped fibers or long fibers or continuous fibers which may or may not be woven;
the method further comprising the method for welding the fibrous reinforcement to the sheet as claimed in claim 1, the welding mold being the post-blowing mold and the pressure of the gas which inflates the wall against the mold being the pressure of the post-blowing gas.

15. A core of a mold for implementing the method as claimed in claim 13, comprising mobile means of positioning the reinforcement near the interior face of the mold.

16. A tank or pipe obtained by a method as claimed in claim 10, comprising:
a wall of thermoplastics material and a fibers reinforcement welded over at least part of its external surface, the fibrous reinforcement comprising a plastics material of same kind as or compatible with that of an external surface of the tank or of the pipe and continuous fibers.

17. The use of a tank as claimed in claim 16 obtained as a fuel tank of a hybrid vehicle.

18. A method for welding a fibrous reinforcement when manufacturing an object chosen from an assembly of a tank and a filling pipe, the object including a wall of thermoplastics material, the welding method comprising:
heating a fibrous reinforcement outside a mold to bring the fibrous reinforcement into a molten state, the fibrous reinforcement including both a thermoplastics material compatible with that of the object and chopped fibers or long fibers or continuous fibers which may or may not be woven, the fibrous reinforcement not increasing significantly a thickness of the object and not decreasing a useful capacity of the object;
introducing the fibrous reinforcement heated into the mold; and
welding, in the mold, the heated fibrous reinforcement to the wall in an at least partially molten state, using pressure of a gas that inflates the wall against the mold.

* * * * *